Figure 1:
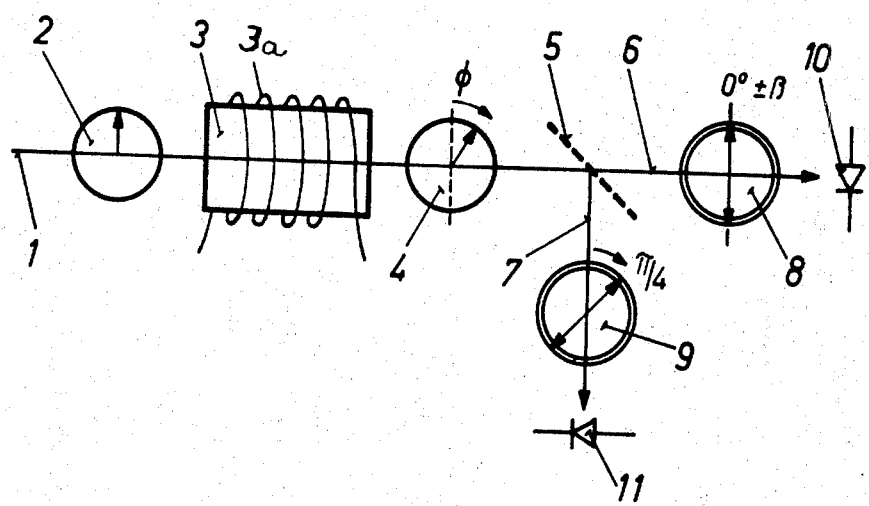

United States Patent
Jaecklin

[15] 3,693,082
[45] Sept. 19, 1972

[54] APPARATUS FOR ELECTRONICALLY MEASURING THE ANGLE OF ROTATION OF THE POLARIZATION PLANE OF A LINEARLY POLARIZED LIGHT BEAM PRODUCED BY PASSAGE OF THE BEAM THROUGH A MAGNETO-OPTICAL ELEMENT SUBJECTED TO A MAGNETIC FIELD TO BE MEASURED

[72] Inventor: Andre Jaecklin, Ennetbaden, Switzerland

[73] Assignee: Aktiengesellschaft Brown, Boveri & Cie, Baden, Switzerland

[22] Filed: Dec. 11, 1970

[21] Appl. No.: 97,181

[30] Foreign Application Priority Data

Dec. 23, 1969 Switzerland............19071/69

[52] U.S. Cl. ..................324/96, 250/225, 356/117
[51] Int. Cl. ............................................G01r 19/00
[58] Field of Search ......250/209, 225; 356/116, 117; 324/96; 356/114, 115

[56] References Cited

OTHER PUBLICATIONS

Ingersoll and James, " A Sensitive Photoelectric Method for Measuring the Faraday Effect," Review of Scientific MS., Vol. 24, No. 1, Jan. 1953, pp. 23–25.

Wild " A Phasemeter for Photoelectric Measurement of Magnetic Fields," Review of Scientific MS., Vol. 24, No. 8, Aug. 1970, pp. 1163–1167.

*Primary Examiner*—Ronald L. Wibert
*Assistant Examiner*—Orville B. Chew, II
*Attorney*—Pierce, Scheffler & Parker

[57] ABSTRACT

An arrangement for measuring the current flow through a conductor includes a magneto-optical element provided with a coil through which the current to be measured is passed. A beam of linearly polarized light passed through the magneto-optical element has its plane of polarization rotated by an amount proportional to the magnetic field produced by the coil, and the light beam after issuing from the magneto-optical element is split by an optical divider into two partial beams having different directions. One of the partial beams is passed through a polarizing filter to a photo-detector and the other beam is also passed through a polarizing filter but which has a pass-through direction rotated by an angle of about 45° relative to that of the other polarizing filter. The respective electrical outputs from the photo-detectors are then fed to multipliers to which sinusoidal signals from a local oscillator are also fed, the outputs from the multipliers are then added and the output from the adding member is then applied to a frequency demodulator.

5 Claims, 2 Drawing Figures

Inventor
André Jaecklin

APPARATUS FOR ELECTRONICALLY MEASURING THE ANGLE OF ROTATION OF THE POLARIZATION PLANE OF A LINEARLY POLARIZED LIGHT BEAM PRODUCED BY PASSAGE OF THE BEAM THROUGH A MAGNETO-OPTICAL ELEMENT SUBJECTED TO A MAGNETIC FIELD TO BE MEASURED

This invention relates to an improved and arrangement for the electronic measurement of the angle of rotation of the plane of polarization of a linearly polarized light beam produced during passage of the light beam through a magneto-optical element subjected to a magnetic field to be measured wherein the light beam, following its passage through the magneto-optical element, is split into two partial beams which are then linearly polarized in different directions and conducted to two photo detectors connected to separate transmission channels leading to an electronic measuring system.

It is known to modulate linearly, or circularly polarized light by means of a magneto-optical element subjected to a magnetic field to be measured, i.e., crystals which are optically activated by a magnetic field extending parallel to the direction of the light ray beam, for example, flint glass, or yttrium-iron garnets, by rotation of the plane of polarization and then by demodulating the wave to draw conclusions as to the modulating magnetic field. In this manner, the light beam can be utilized as an information carrier so that a "contact-free" measurement is possible, for example, even of high voltages which no longer permit use of conventional measuring transformers because of difficulties encountered in providing a satisfactory insulation.

Specifically, it is known (Rev. Gen. de L'Electr. July-August, 1967 p. 1046) to conduct a linearly polarized light ray beam through a magneto-optical element surrounded by a current-carrying coil, and to arrange following this element an analyzer rotated by 45° relative to the polarizer. The intensity of the ray beam following the analyzer is then measured with a photo-multiplier and is given by the equation $$I = I_o \cdot \cos^2(45° + \phi)$$

where $I_o$ is the magnitude of the light intensity ahead of the analyzer and $\phi$ the angle by which the plane of polarization of the light is rotated after passing through the optically active element. As can be seen from this equation, the relation between the angle of rotation $\phi$ and the measured light intensity is not linear, which results either in a difficult-to-plot or a complicated electronic measuring system. Another disadvantage of this method is that fluctuations in intensity of the light source from which the light beam is produced, and also instabilities in the electronic measuring system falsify the results of the measurement.

Another known mode of measurement, as described at pages 1,057 ff. of the above-noted publication endeavors to eliminate these disadvantages by connecting an additional magneto-optical element following the described magneto-optical element whose optical activity is so oriented and regulated that the preceding rotation of the polarization plane is compensated. The current necessary to effect this compensation serves as the measuring quantity. Such a compensation method is better than the first one mentioned, but has the disadvantage that a too long response time is required, or a too high control power becomes necessary.

It is also known (IEEE J. of Qu. El. QE–2, 255 ff. and 589 ff.) to split the light beam, following its passage through the magneto-optical element, by means of a Glan-Thomson-prism, the two crossed directions of oscillations of which are aligned symmetrically to the plane of oscillation of the unrotated light, into two partial light beams with mutually perpendicular planes of oscillation and then to conduct each partial beam to a corresponding photo-detector whose output is connected to the input of a corresponding differential amplifier. This measuring method is not sufficiently sensitive, however, and in addition it is susceptible to trouble.

It has therefore been suggested to split the light beam by a Koesters-double prism before it passes through the magneto-optical element, and to measure the intensity of the resulting interference bands. Two bands which are phase-shifted by 90° can then be selected by two slit diaphragms, and their respective intensities transmitted to correspondingly associated photo-detectors. Two signals which are phase-shifted by 90° are thus available for the electronic value determining system. This has a general advantage, as is known from high-frequency engineering technique, that amplitude-disturbances caused by interferometer disturbances or the transmission channels in the case of subsequent mixing and frequency demodulation of the signals enter considerably reduced into the measurement. Moreover, the phase-shifted signals have the advantage for an electronic evaluating system that a particularly accurate FM-signal can be derived when they are mixed with the frequency of a local oscillator. (Swiss patent 433,065). This method has the disadvantage, however, that the selection of the 90° phase-shifted bands by means of slit diaphragms results in light losses.

The object of the present invention is to so improve upon the above mentioned modes of measurement that one has at his disposal for introduction into the electronic evaluation system suitable phase-shifted signals which provide a high resolution and low susceptibility to troubles.

This objective is achieved, in accordance with the invention by polarizing the two partial beams in planes of oscillation inclined by an angle of about 45° to each other. The orientation of the directions of oscillation to the plane of oscillation of the unrotated light is irrelevant. Preferably, however, the direction of oscillation of one partial beam is parallel to that of the unrotated light. The partial beams are as far as possible equal in their intensity.

In the case where the direction of oscillation of a partial beam is parallel to that of the unrotated light, the measurement according to the present invention results in the following situation.

If $A_1$ is the amplitude of the first partial wave and $A_2$ that of the second partial wave, the amplitude of the wave after the first polarizer oriented parallel to the original polarization direction is equal to $A_1 \cos \phi$, and that of the wave after the second polarizer is equal to $$A_2 \cos\left(\frac{\pi}{4} - \phi\right),$$

$\phi$ being the angle of rotation of the plane of polarization of the light effected by the magneto-optical element. The intensity measured by the photo-detectors is proportional to the square of the amplitude, and the electric currents supplied are therefore:

$$i_1 \sim A_1^2 \cos^2 \phi$$

and $$i_2 \sim A_2^2 \cos^2 \left(\frac{\pi}{4} - \phi\right) \quad (1)$$

By known trigonometric functions, one obtains:

$$i_1 \approx (A_2^2/2)(1 + \cos 2\phi) \text{ and} \quad (2)$$

$$i_2 \approx (A_2^2/2)(1 + \sin 2\phi)$$

The electronic evaluating system thus has two parallel signals available which are phase-shifted by 90°, i.e., the signals are in quadrature.

A frequent error of a magneto-optical element of the above-described type lies in a depolarization of the light, i.e., the energizing ray is polarized elliptically instead of linearly. Such a depolarization appears for a certain type of error, for example, in the case where the magneto-optical element possesses some double refraction or exhibits Voight-effect, or particularly with multiple reflections within the magneto-optical medium, if non-ideal mirrors or non-ideal divider plates are utilized. Errors of this type manifest themselves, apart from amplitude variations which can be balanced without major expenditures, by an additional phase displacement of the detector signals. According to an important embodiment of the invention, the angle between the directions of oscillation of the two partial beams of $\pi/4$ provided, i.e., 45° for the ideal case is varied by rotating the polarizers by a positive, or negative angle $\beta$ until the phase displacement of the detector signals has attained the desired value of $\pi/2$ i.e., 90°. A great portion of the phase displacements caused by the above-mentioned errors can be balanced by means of these expedients. A check to see whether the two signals are in the optimum quadrature relationship can be easily made, for example, by applying the two signals to the coordinate amplifiers of an oscilloscope. In the optimum quadrature relationship between the two signals, one will see a circle on the screen.

Figure 2:
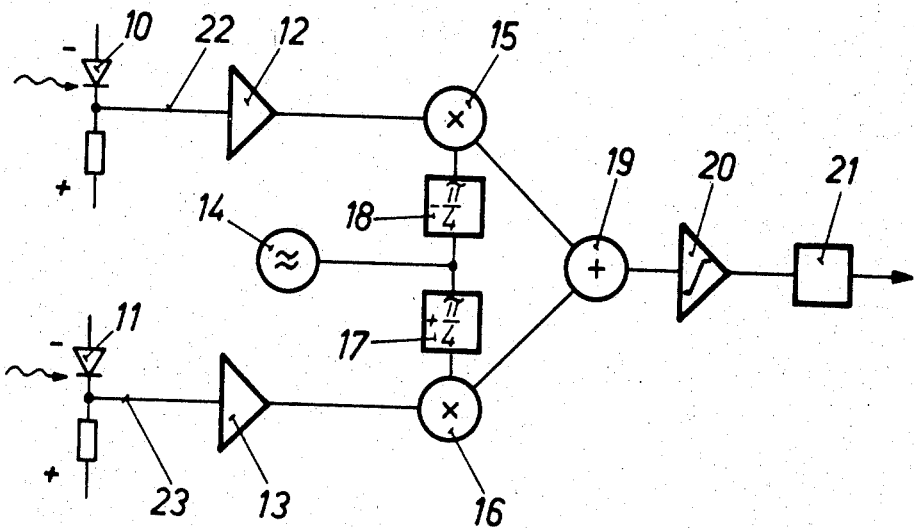

Other advantages and features of the invention will become more apparent from the following description of one suitable embodiment thereof and from the accompanying drawings wherein:

FIG. 1 is a schematic representation of the optical arrangement up to the photo-detectors for measuring a magnetic field in accordance with the improved technique of the invention; and FIG. 2 illustrates, in schematic form, the electrical circuit for evaluating the magnetic field from information passed to it from the photo-detectors.

With reference now to the drawings, and to FIG. 1 in particular, it will be seen that a light beam having an amplitude A is passed through a magneto-optical element 3 surrounded by a coil 3a carrying a current to be measured. After emerging from the magneto-optical element 3, the light beam is directed onto a 45° inclined divider plate 5 where it is split into two partial beams 6 and 7 of about equal intensity. The partial beam 6 passes directly through the divider plate, its direction being unchanged, whereas the other partial beam 7 is reflected by an angle of 90° relative to partial beam 6.

Before entering the magneto-optical element 3, the light beam 1 is polarized linearly. Its state of oscillation is indicated in the circle 2. The plane of oscillation of the light beam 1 is then rotated by the angle $\phi$ after passing through the magneto-optical element 3, if a magnetic field is produced in the element 3 by current flowing through coil 3a. The state of polarization of the beam after passing through the magneto-optical element 3 is indicated in circle 4.

After leaving the divider plate 5, the partial beams 6 and 7 are conducted respectively through polarizers, which are preferably polarization filters, 8 and 9, and pass to their respectively associated photo-detectors 10 and 11. The direction of oscillation of filter 8, i.e., its pass-through direction, is approximately parallel to the plane of oscillation of the unrotated light, i.e., 0° ± $\beta$ as indicated in circle 2. Filter 9 is rotated by an angle of about $\pi/4$ with respect to the direction of oscillation of filter 8.

After the light has been transformed into corresponding electrical signals in the photo-detectors 10 and 11, the signals arrive in form according to Equation (1) and (2) respectively via conductors 22, 23, at the input amplifiers 12, 13 shown in FIG. 2. As a rule, the direct current portion of the signals is split off here. The outputs from amplifiers 12, 13 are delivered respectively to multiplying mixer stages 15, 16 which can be, for example, ring modulators, or four-quadrant multipliers. In these mixer stages $i_1$ equal to $k_1 \cos 2\phi$ ($k_1$ being a constant) is multiplied by a signal $g_1$ equal to $$\cos\left(\omega_0 t - \frac{\pi}{4}\right)$$

Similarly, $i_2$ equal to $k_2 \sin 2\phi$ ($k_2$ being a constant) is multiplied by a signal $g_2$ equal to $$\cos\left(\omega_0 t - \frac{\pi}{4}\right)$$

$\omega_0$ is the frequency generated in the local oscillator 14 and correspondingly phase-shifted by the phase-shifters 17,18 connected respectively to inputs of the mixer 15,16.

These products from the outputs of the mixer stages 15,16 are delivered to, and added in, an adding unit 19 and one thus obtains (with $k_1 = k_2 = 1$ and without consideration of a phase constant) an electrical signal having the form:

$$G(t) = \cos(\omega_0 t - 2\phi(t))$$

and which can be easily frequency-demodulated in a conventional manner in the after-connected demodulator unit 21 after being passed through a limiting amplifier unit 20.

In conclusion, the invention accordingly yields a high resolution of the electronic system with a maximum yield of the optical system. I claim:

1. Apparatus for measuring the current flowing through a conductor comprising a magneto-optical element including a coil through which the current is passed to produce a corresponding magnetic field, means for passing a beam of linearly polarized light through said magneto-optical element which effects a rotation of the polarization plane proportional to the magnetic field, an optical divider into which said light beam is directed after leaving said magneto-optical element, said divider serving to split said light beam into two partial light beams, means directing one of said partial beams through a first polarizer to a first photo-detector, means directing the other partial beam through a second polarizer to a second photo-detector, said second polarizer transmitting light polarized in a direction rotated by about 45° relative to that of said first polarizer, multipliers individual to and receiving the respective outputs from said first and second photo-detectors, a local oscillator having its output connected into said multipliers to mix the respective detector signals with a sinusoidal oscillation signal from said oscillator, an adding member to which the outputs from said multipliers are connected, and a frequency demodulating device to which the output from said adding member is connected.

2. Apparatus as defined in claim 1 wherein at least one of said polarizers is rotatable whereby the phase shift between said detector signals can be varied to attain a value of exactly 90°.

3. Apparatus as defined in claim 1 wherein the direction of polarization of said first polarizer is oriented parallel to the oscillation plane of the unrotated light.

4. Apparatus as defined in claim 1 and wherein phase shifting means are included in the connections between the output of said local oscillator and said multipliers and which effect a relative phase shift of $\pi/2$ in the oscillator output applied respectively to said multipliers.

5. Apparatus as defined in claim 4 wherein the output from said oscillator to one of said multipliers includes a phase shifter of $+\pi/4$ and the oscillator output to the other multiplier includes a phase shifter of $-\pi/4$.

* * * * *